United States Patent [19]
Dejmek

[11] Patent Number: 5,263,175
[45] Date of Patent: Nov. 16, 1993

[54] DIVERSITY REPEATER DIAGNOSTIC METHOD AND APPARATUS

[75] Inventor: James W. Dejmek, Lombard, Ill.
[73] Assignee: Motorola, Inc., Schaumburg, Ill.
[21] Appl. No.: 590,191
[22] Filed: Sep. 28, 1990
[51] Int. Cl.$^5$ .................. H04B 1/60; H04B 17/02
[52] U.S. Cl. ..................... 455/10; 455/34.1; 455/34.2; 455/54.1; 455/134
[58] Field of Search ............. 455/10, 17, 134, 140, 455/34.1, 34.2, 54.1

[56] References Cited

U.S. PATENT DOCUMENTS

| | | | |
|---|---|---|---|
| 4,035,728 | 7/1977 | Ishikawa et al. | 455/134 |
| 4,039,947 | 8/1977 | Miedema | 455/17 |
| 4,317,229 | 2/1982 | Craig et al. | 455/134 |
| 4,823,398 | 4/1989 | Hashimoto | 455/140 |
| 4,868,885 | 9/1989 | Perry | 455/10 |
| 4,965,548 | 10/1990 | Fayfield | 455/134 |

FOREIGN PATENT DOCUMENTS 0170124 7/1989 Japan .................. 455/134

Primary Examiner—Reinhard J. Eisenzopf
Assistant Examiner—Timothy H. Keough
Attorney, Agent, or Firm—Timothy W. Markison; Steven G. Parmelee

[57] ABSTRACT

A diversity repeater that incorporates diversity diagnostic circuitry. The diversity diagnostic circuitry monitors the outputs of at least two receivers and determines the signal strength of the transmissions received by each receiver. If the signal strength for a particular receiver is below a predetermined threshold, the diversity diagnostic circuitry determines whether that receiver is receiving a rayleigh faded transmission or is an inoperative mode.

6 Claims, 2 Drawing Sheets

5,263,175

DIVERSITY REPEATER DIAGNOSTIC METHOD AND APPARATUS

TECHNICAL FIELD OF THE INVENTION

This invention relates generally to diversity repeaters and in particular to a diversity repeater diagnostic method and apparatus.

BACKGROUND OF THE INVENTION

Repeaters typically convey communications between a plurality of communication units via at least one communication resource assigned to that particular repeater. Due to the effects of rayleigh fading, the signal strength of a transmitted communication may be so poor as to render the communication undetectable. In order to reduce the effects of rayleigh fading, a diversity repeater, which comprises at least two receivers such as FM receivers, may be used. The two receivers of the diversity repeater each receive the same transmission, which may be subsonic, audio, ultrasonic, or data signals, however, by having the antennas of the receivers adequately separated, the signal strength of the transmissions received by each receiver is generally different. Typically, the repeater compares the signal strength of the received transmissions and conveys, via a communication resource, the received transmission with the higher signal strength.

When one of the received transmissions has poor signal strength, the repeater typically cannot determine whether that receiver is inoperative, has failed, or is receiving a rayleigh faded signal. If a receiver fails, the diversity feature of the repeater may be lost, therefore, a need exists for a method and apparatus that determines when a receiver is receiving a faded transmission or the receiver has become inoperative.

SUMMARY OF THE INVENTION

These needs and others are substantially met by the diversity repeater diagnostic method and apparatus disclosed herein. A diversity repeater having a first receiver that receives a transmission via at least one communication resource, and a second receiver that is sufficiently separated from the first receiver and that receives the same transmission, wherein the diversity repeater is improved to comprise diagnostic circuitry. The diagnostic circuitry is coupled to the first and second receivers, and determines whether the first receiver or the second receiver is in a fade mode or an inoperative mode.

In an aspect of the present invention, the diagnostic circuitry determines whether the signal strength of the transmission received by each of the receivers is above a predetermined threshold. If the signal strength of a transmission received by one of the receivers is less than the predetermined threshold, the diagnostic circuitry increments a counter for that receiver and clears a counter for the other receiver. Once the counter for a particular receiver reaches a predetermined value, an alarm is set which indicates that the particular receiver is in an inoperative mode.

DESCRIPTION OF A PREFERRED EMBODIMENT

Figure 1A:
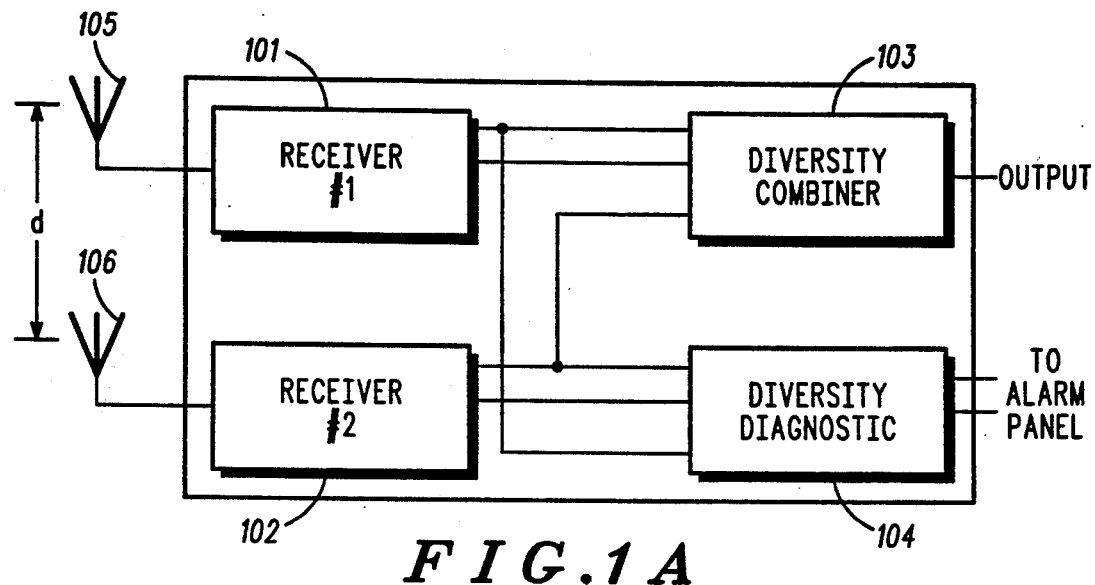
FIG. 1A illustrates block diagram of a repeater in accordance with the present invention.

FIG. 1 illustrates a block diagram of a diversity repeater (100). The diversity repeater comprises a first receiver (101), a second receiver (102), a diversity combiner (103), diversity diagnostic circuitry (104), and two antennas (105 and 106). Each of the antennas (105 and 106) is operably coupled to a receiver (101 and 102), and is physically separated by a distance of d. The separation of the antennas is dependent on the operating frequency of the carrier signal. A diversity repeater that incorporates the diversity combiner is disclosed in co-pending patent application having a title of IMPROVED LINEAR WEIGHTING METHOD AND DEVICE FOR DIVERSITY RECEPTION, now U.S. Pat. No. 5,239,698.

Figure 1B:
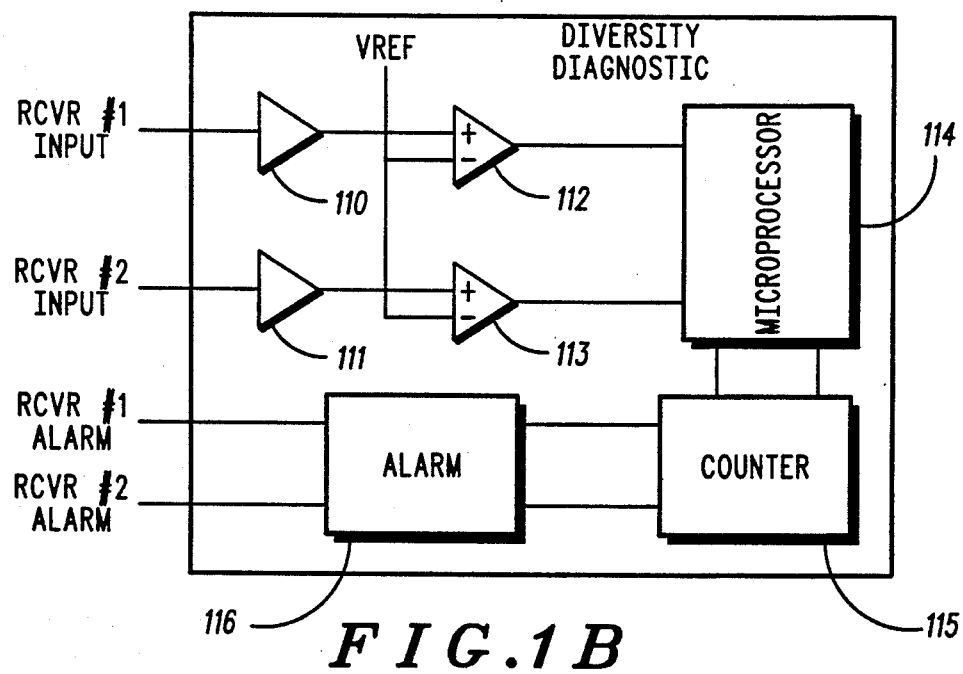
FIG. 1B illustrates a block diagram of diversity diagnostic circuitry in accordance with the present invention.

FIG. 1B illustrates a block diagram of the diversity diagnostic circuitry (104). The diversity diagnostic circuitry (104) comprises two buffers (110 and 111), two comparators (112 and 113), a microprocessor (114), a counter (115), and an alarm (116). Typically, a representation of the signal strength of the transmission received is inputted to the first buffer (110) and is compared to a reference signal or voltage by comparator (112) to determine the relative signal strength of that transmission. Depending on the signal to noise ratio of the communication units, which may be portable radios, mobile radios, or operator positions, the relative signal strength will vary. Similarly, the representation of the signal strength of transmission received by receiver two (102) is buffered by a buffer (111) and is compared with the reference signal by a comparator (113). Generally, if a representation of a received transmission for either receiver (101 or 102) is below the reference signal, the microprocessor (114) initiates a diagnostic procedure to determine whether a receiver is in a rayleigh fade mode or in inoperative mode as illustrated in FIG. 2.

Figure 2:
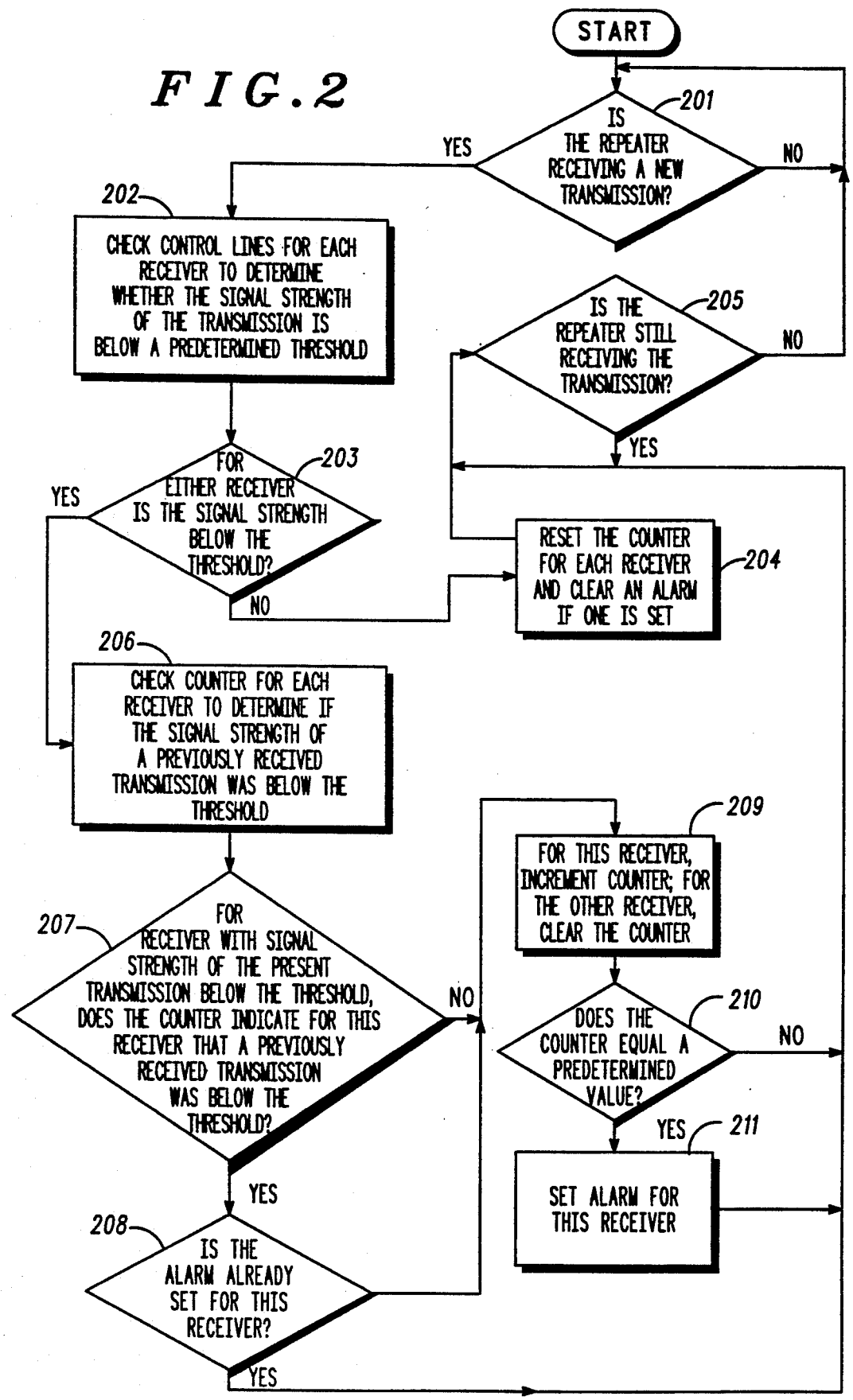
FIG. 2 illustrates a logic diagram of an implementation of the present invention.

FIG. 2 illustrates a logic diagram which may be performed by the microprocessor (114) of the diversity diagnostic circuitry (104). At step 201, the microprocessor (114), which may be any commercially available microprocessor or microcomputer, determines whether the repeater is receiving a new transmission. If the repeater is not receiving a new transmission, the diversity diagnostic circuitry awaits for a new transmission to be received. When the repeater is receiving a new transmission (201), the microprocessor checks the control lines (output of comparators (112 and 113)) to determine whether the signal strength of the transmission is below a predetermined threshold for either of the receivers (101 or 102). If the transmission received by both receivers is above the predetermined threshold (203), the counter for each receiver is reset and any alarms, if set, are cleared (204). Once the counters and alarms are reset and cleared, the microprocessor determines whether the repeater is still receiving a transmission (205). If the microprocessor (114) determines that the repeater is still receiving a transmission (205), the microprocessor awaits for the transmission to end, once the transmission ends the process repeats at step (201).

If the signal strength of a receiving transmission is below the predetermined threshold for either receiver (203), the microprocessor checks the counter for each receiver to determine if the signal strength of a previously received transmission was below the predetermined threshold during a previous predetermined interval (206). (A previous predetermined interval constitutes a previous transmission such that the microprocessor begins the process over at step 201. The counter (115), which may be any digital counter, shift register, or an internal counter in the microprocessor, counts the number of consecutive transmissions that have had a signal strength below the predetermined value for a particular receiver.) At step 207, the microprocessor determines whether the receiver that is presently receiving a transmission below the predetermined signal strength level has, on the previous transmission, had the signal strength of the previous transmission below the predetermined threshold. If the signal strength of the previous transmission was below the predetermined threshold for this receiver (207), the microprocessor determines if an alarm is already set for this receiver (208). If an alarm is set, the process repeats at step (205) awaiting for the end of transmission. The alarm may be a signal sent to a central processor to indicate that this particular receiver is in an inoperative mode, it may be used to disable the receiver, and/or it may be sent to the diversity combiner (104).

If the alarm is not set (208), or the signal strength of the previously received transmission by this particular receiver was above the predetermined threshold, the counter is incremented for this particular receiver and the counter is cleared for the other receiver (209). The microprocessor (114) then compares the counter to a predetermined value, which is arbitrarily chosen based on the environment in which the repeater is placed. If the counter equals a predetermined value, an alarm is set for that particular receiver (211), otherwise the process repeats at step (205).

What is claimed is:

1. An improved diversity repeater having:
   first receiver means for receiving a transmission that is transmitted via at least one communication resource to produce a receiving transmission;
   second receiver means, being separated from the first receiver means by a predetermined distance, for receiving the receiving transmission; wherein the improvement comprises:
   diagnostic means, operably coupled to the first receiver means and the second receiver means, for determining whether the first receiver means or the second means is temporarily receiving a faded transmission or is in an inoperative mode, for determining whether the receiving transmission received by the first receiver means and the second receiver means has a signal strength less than a predetermined threshold, for determining, during a predetermined interval, whether the signal strength of a previously received transmission by the first receiver means and the second receiver means was less than the predetermined threshold, and counter means for counting, for the first receiver means and the second receiver means, consecutive predetermined intervals in which the previously received transmission was less than the predetermined threshold, and counter resetting means, operably coupled to the counter means for resetting counting when the present received transmission is not less than the predetermined threshold.

2. In the improved diversity repeater of claim 1 the diagnostic means further comprises alarm means operably coupled to the counter means for generating an alarm when, for either the first receiver means or the second receiver means, the counting reaches a predetermined value.

3. In a communication system that has a plurality of communication units and at least one communication resource, wherein the at least one communication resource is transceived by at least one repeater having at least two receivers, a method for the repeater to determine whether at least one of the at least two receivers is temporarily receiving a faded transmission or is in an inoperative mode, the method comprises the steps of:
   a) determining whether the at least one repeater is receiving a transmission to produce a receiving transmission;
   b) determining, for each of the at least two receivers, whether the receiving transmission has a signal strength that is less than a predetermined threshold;
   c) determining whether the at least one of the at least two receivers is temporarily receiving a faded transmission or is in an inoperative mode when the signal strength of the receiving transmission that is being received by the at least one of the at least two receivers is less than the predetermined threshold;
   d) determining, during a predetermined interval and for each of the at least two receivers, whether the signal strength of a previously received transmission was less than the predetermined threshold; and
   e) incrementing a counter for at least one of the at least two receivers when the previously received transmission was less than the predetermined threshold and clearing the counter for at least one of the at least two receivers when the presently received transmission is not less than the predetermined threshold.

4. The method of claim 3 further comprises the step of setting an alarm when the counter reaches a predetermined value to indicate that the at least one of the at least two receivers is in an inoperative mode.

5. In a communication system that has a plurality of communication units and at least one communication resource, wherein the at least one communication resource is transceived by at least one repeater, wherein the at least one repeater is improved to comprise:
   first receiver means for receiving a transmission that is transmitted via at least one communication resource to produce a receiving transmission;
   second receiver means, being separated from the first receiver means by a predetermined distance, for receiving the receiving transmission;
   diagnostic means, operably coupled to the first receiver means and the second receiver means, for determining whether the first receiver means or the second means is temporarily receiving a faded transmission or is in an inoperative mode, for determining whether the receiving transmission received by the first receiver means and the second receiver means has a signal strength less than a predetermined threshold, for determining, during a predetermined interval, whether the signal strength of a previously received transmission by the first receiver means and the second receiver means was less than the predetermined threshold, and counter means for counting, for the first receiver means and the second receiver means, consecutive predetermined intervals in which the previously received transmission was less than the predetermined threshold, and counter resetting means, operably coupled to the counter means, for resetting counting when the present received transmission is not less than the predetermined threshold.

6. In the improved repeater of claim 5 the diagnostic means further comprises alarm means operably coupled to the counter means, for generating an alarm when, for either the first receiver means or the second receiver means, the counting reaches a predetermined value.

* * * * *